United States Patent

[11] 3,593,898

| | | |
|---|---|---|
| [72] | Inventor | Paul A. Diforte<br>2615 Pelham Ave., Baltimore, Md. 21213 |
| [21] | Appl. No. | 768,078 |
| [22] | Filed | Oct. 16, 1968 |
| [45] | Patented | July 20, 1971 |

[54] SPARE TIRE AND WHEEL CARRIER
4 Claims, 13 Drawing Figs.

[52] U.S. Cl. .................................... 224/42.1,
224/42.2, 224/42.24
[51] Int. Cl. .................................... B60r 9/04
[50] Field of Search .................................... 224/42.1,
42.1 D, 42.1 E, 29, 42.12, 42.13, 42.14, 42.2,
42.25; 296/37.2; 220/40

[56] References Cited
UNITED STATES PATENTS

| | | | |
|---|---|---|---|
| Des.185,846 | 8/1959 | Baxter | 224/42.1 (E) X |
| 2,094,328 | 9/1937 | Lyon | 296/37.2 |
| 2,171,786 | 9/1939 | Ellenberger | 224/42.2 |
| 2,610,083 | 9/1952 | Keller | 296/37.2 |
| 2,816,682 | 12/1957 | Brucker | 220/40 X |
| 2,839,232 | 6/1958 | Homeier | 224/42.12 |

FOREIGN PATENTS

| | | | |
|---|---|---|---|
| 18,766 | 8/1910 | Great Britain | 224/42.2 |

*Primary Examiner*—Gerald M Forlenza
*Assistant Examiner*—Frank E. Werner
*Attorney*—J Wesley Everett

ABSTRACT: A spare tire and wheel carrier adapted to be carried on the roof structure of an automobile. The carrier comprising a base having a chamber for the tire and wheel with a cover therefor and means for locking the cover to the base. The cover and base having interengaging latchlike extensions positioned about the respective joining peripheries of the base and cover for latching and pulling the cover down to the base member when the cover is partially rotated and in engaged position with the base member. For positioning the tire and wheel within the chamber of the base in a positive manner the base is provided with an upwardly extending frustoconical shaped structure having bolts and nuts positioned at the top thereof for fastening the tire and wheel to the said structure. The top center of the cone structure is provided with an upwardly extending projection over which the center hole of the wheel is threaded for positioning and centering the tire and wheel to the cone support. The spare tire and wheel carrier having means for fastening the same to the roof structure of an automobile.

PATENTED JUL 20 1971
3,593,898
SHEET 1 OF 3
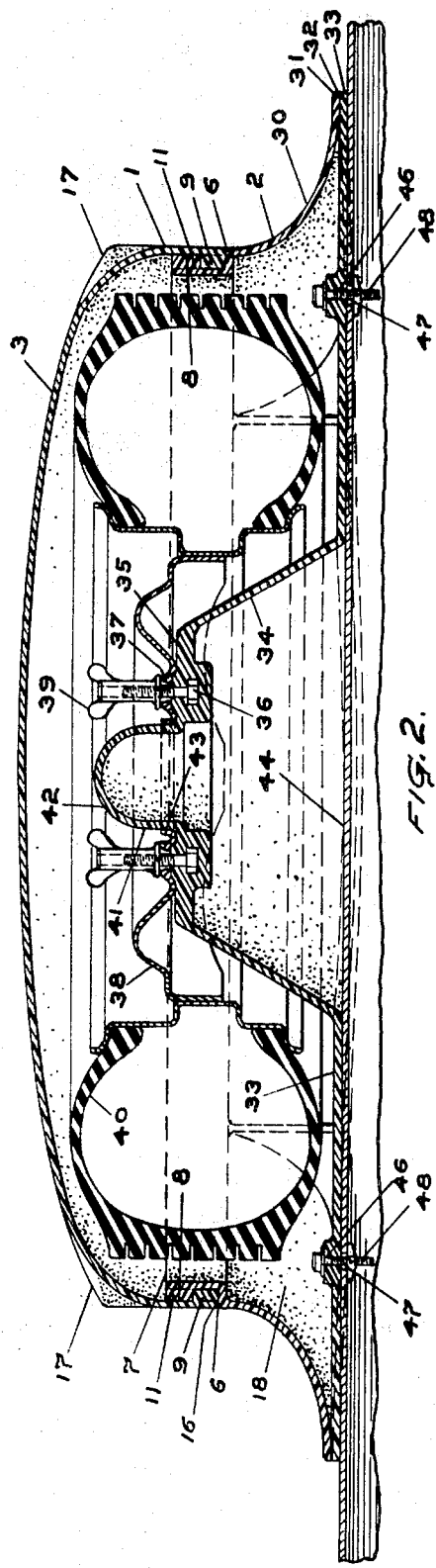
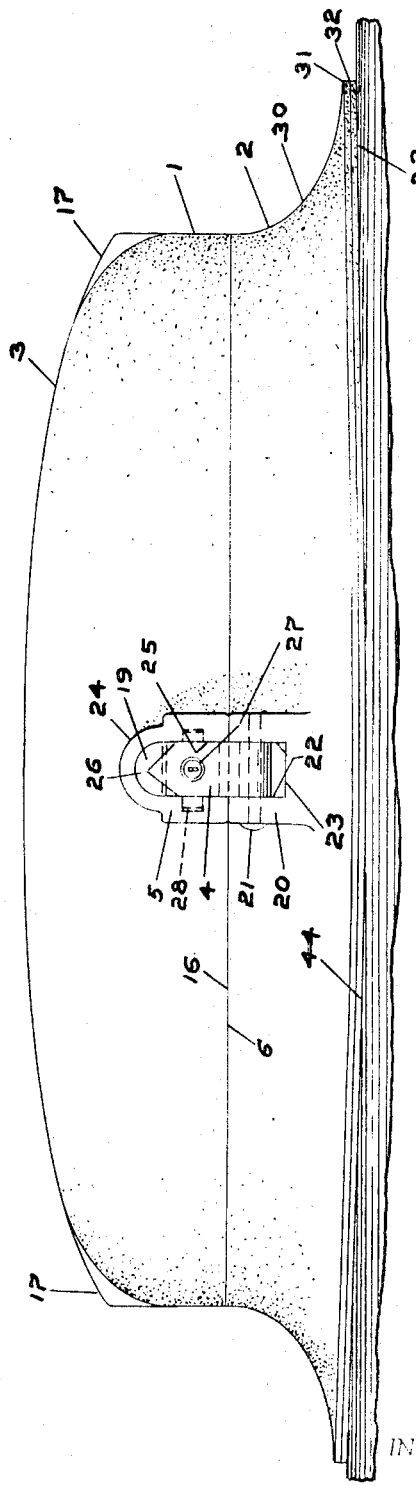
INVENTOR
Paul A. Diforte
BY
ATTORNEY

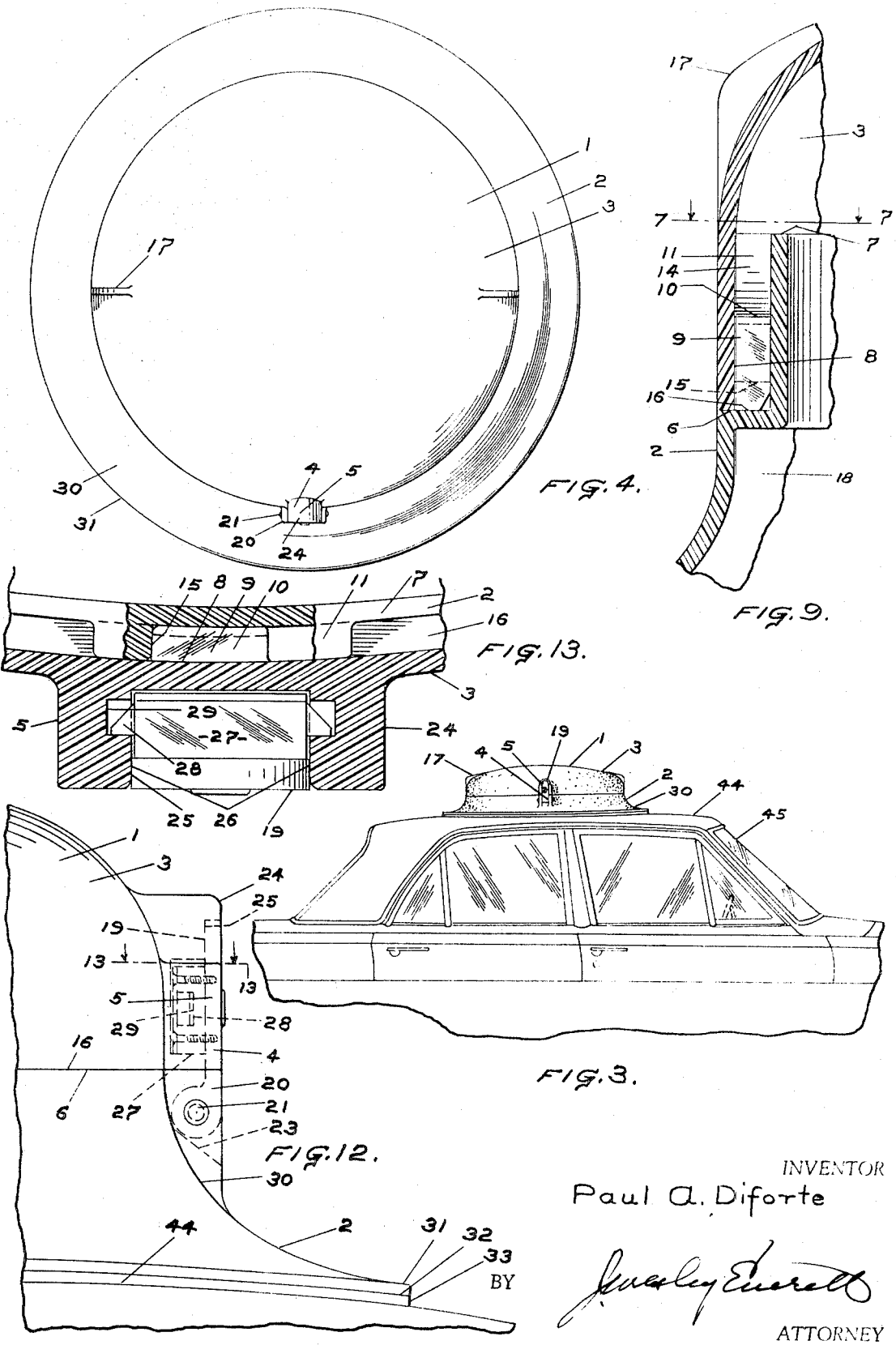

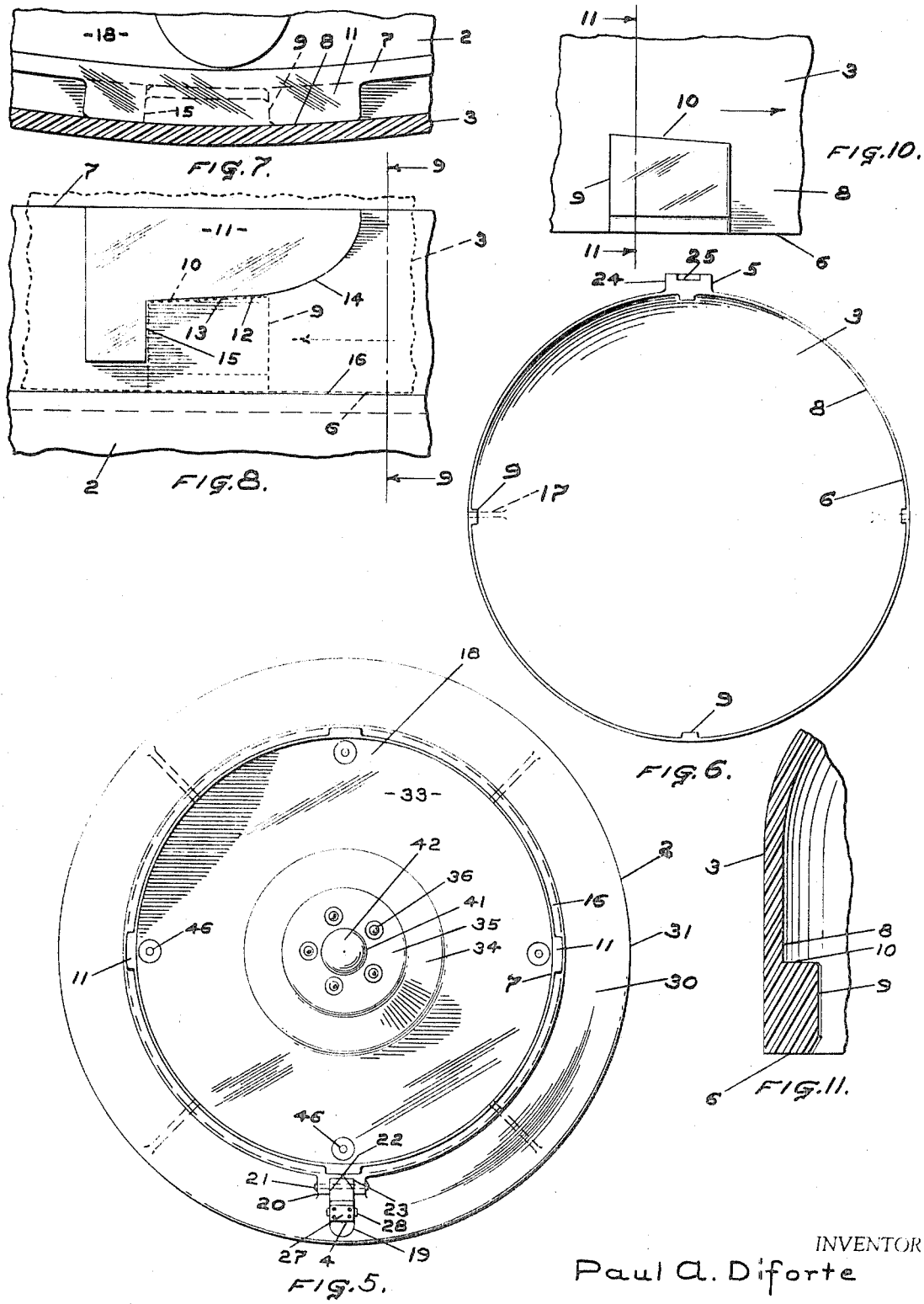

SPARE TIRE AND WHEEL CARRIER

The invention relates to a circular and comparatively flat structural design of a spare tire and wheel carrier, that is particularly adaptable to being supported and fastened to the roof of an automobile body.

An object of the invention is to provide such a tire carrier with a primary housing base portion having an inner chamber with a frustoconical tire and wheel support therein with bolt members positioned on the top thereof for supporting and fastening the tire and wheel within the chamber.

Another object of the invention is to provide the upper portion of the frustoconical structure with an upwardly directed center extension over which the center hole of the wheel member is threaded for centering the position of the tire and wheel in relation to the support and chamber therefor.

Still another object of the invention is to provide the primary housing and its chamber with an overlapping cover or lid, with the peripheral overlapped edges of the housing and cover each having a plurality of outwardly and inwardly extending latchlike interengaging projections respectively with means for fastening and locking the respective latchlike members in interengaged position for the purpose of holding the cover in a closed pulled down position with a lock assembly on the cover and base to hold and prevent these members from being disengaged.

Another object of the invention is to provide the cover with means whereby the cover may be fully and readily removed from the base by releasing its locking member and twisting the cover counterclockwise approximately 10° in relation to the base structure to release the interengaging cover pulldown wedge or latch members from the base.

With these and other objects in view together with important structural details relating thereto which will appear as the present invention is described and claimed, consists in the construction, combination and general arrangement of parts relating thereto.

In the accompanying drawings I have illustrated my invention in its preferred form. It being understood various elementary changes may be made without departing from the spirit of the invention.

IN THE DRAWINGS

FIG. 1 is a side elevational view of the spare tire and wheel carrier of the invention, shown positioned on a fragmentary portion of the top of an automobile.

FIG. 2 is a fragmentary sectional view of the carrier taken on the plain of FIG. 1 but slightly irregular at its center area whereby two of the wheel holddown bolts may be seen.

FIG. 3 is a fragmentary elevational view of an automobile body illustrating my carrier positioned on the roof of an automobile body.

FIG. 4 is a plan view of the carrier.

FIG. 5 is a plan view of the carrier with the carrier cover having been removed.

FIG. 6 is an inverted plan view of the removable cover for the carrier.

FIG. 7 is a fragmentary sectional plan view of the cover and base latch or wedgelike clamping assemblies taken on the line 7-7 of FIG. 9.

FIG. 8 is a fragmentary elevational view of FIG. 7 with the cover portion having been removed showing in detail one of the cover pulldown latch or wedge members that is formed integrally with the upper wall of the base; the cover portion being shown in fine dotted lines.

FIG. 9 is a fragmentary sectional view in elevation taken on the line 9-9 of FIG. 8 with the cover in holddown position.

FIG. 10 is a fragmentary elevational detail view of a portion of the inside peripheral face of the cover showing one of the latch or wedge-engaging knobs or latch bolts formed integrally with the inside cover surface.

FIG. 11 is a fragmentary sectional view taken on the line 11-11 of FIG. 10.

FIG. 12 is a fragmentary side elevational view of the base and cover lock assembly.

FIG. 13 is a fragmentary sectional plan view taken on the line 13-13 of FIG. 12 showing details of the lock assembly for holding the cover to the base in locked position.

Referring to the drawings by reference numerals, each of which represents the same or similar parts throughout the various views and with particular reference to FIGS. 1 to 3 the present invention consists of a novel form of spare tire and wheel carrier 1 comprising a base structure 2 and cover 3 therefor, with a lock 4 and lock keeper 5 carried by the base 2 and cover 3 respectively for holding the cover to the base in a tamper-proof locked position when the lock is in engaged position.

The cover 3 and base 2 are each provided with cooperating wedge latchlike clamping means at their respective opening edge areas 6 and 7 for holding the cover in tightly closed position to the base when the clamping means are in interengaged closed position. In this respect, the inner wall 8 of the cover 3 at the peripheral edge area 6 of the cover is provided with a plurality of rectangularly shaped extensions to be hereinafter referred to as latch bolts 9 circumferentially spaced about 90° apart about the edge area 6 and formed integral with the cover member with an upper slightly inclined surface 10, the function of which will be hereinafter described.

The peripheral edge area 7 of the base 2 is provided with four wedge or clamplike members 11, to be hereinafter referred to as latch keepers 11, circumferentially spaced about 90° apart about the edge 7. With particular reference to FIG. 8 of the drawings, the undersides 12 of the latch keepers 11 are each provided with a slightly inclined face surface 13. In this respect, the respective inclined surfaces 10 and 12 of the bolts 9 and keepers 11 are substantially the same for purposes of a snug engagement when these elements are in fully engaged position, i.e. when the cover is in fully closed position. The latch keepers 11 are also provided with curved guiding surfaces 14 and stop portions 15 for guiding and stopping the movement of the latch bolts 9 of the cover respectively when moving into engagement with the keeper 11.

When placing the cover 3 on the base 2 the cover is pushed down until its edge 6 comes in contact with the circumferential step 16 of the base which acts as an engagement stop for the closed position of the cover. Then by turning the cover clockwise by the finger grips 17 at the top thereof until the latch bolts 9 move to a clamping and latched position with their respective keepers 11 and engaged position with their respective stops 15 the cover will be tightly engaged to the base 2. This together with the overlapping of the respective edges 6 and 7 of the cover and base members prevents dust and rain reaching the chamber 18. As may be readily seen the inclined surfaces 10 and 13 of the bolts and keepers respectively, when in fully engaged position, tends to draw the cover down tightly to the base step 16 and thereby providing a substantially rain and weather proof joint between the cover and base members.

For purposes of maintaining this tight engagement between the cover and base for the purposes as stated about and to also prevent theft of the contents of chamber 18 by rotating the cover 3 counterclockwise to release the bolts from their respective keepers for removing the cover, the lock assembly 4 has been provided to prevent this action. In this respect the lock assembly 4 comprises a hasp 19 pivotably engaged at its lower portion to the base 2 at the base extension 20 by the headed pin 21 and between the opposed walls 22 of the recess 23 in the base extension. In this respect the cover 3 has a cover extension 24 provided with a recess 25 having opposed walls 26 into and between which the upper portion of the hasp 19 is snugly positioned when in locked engagement with the cover together with its conventional key-actuated type of hasp lock member 27 fastened to the back thereof and having oppositely disposed and key-actuated bolt members 28 that engage their respective keeper recesses 29 formed in said oppositely disposed walls 26 as shown particularly in FIG. 13.

An important feature of the invention is to provide means whereby the recess 25 and its opposed walls 26 of the cover extension 24 will become self-aligned with the hasp member 19 for ready engagement therewith when it is desirable to lock the cover in closed position by swinging the hasp upward and thence snapping it into the cover recess 25 whereby the conventional spring yielding and operated hasp lock bolts 28 become engaged with their respective keeper recesses 29. This self-aligning feature is brought about due to the following explained operation. The fully engaged stop positions of the cover bolts 9 with their respective stops 15 of the base latch keepers 11 are such as to location in relation to the hasp 19 of the base 2 and the opposed walls 26 of the recess 25 of the cover extension, as to place the hasp 19 of the base in alignment with the recess 25 and its opposed walls 26 of the cover extension in alignment with each other whereby the base connected hasp may be readily snapped into locked position in the recess 25 and between the opposed walls 26 of the cover for locking the same in a nonrotatable position. To reverse the above operation for removal of the cover it is only necessary to use the lock key to withdraw the hasp lock bolts 28 from their respective keeper recesses 29, swing the hasp outward sufficiently to clear the cover extension recess 25 turn the cover counterclockwise a few inches or enough to clear the cover bolts 9 from their respective base keepers 11 for readily removing the cover from the base 2.

In reference to the manner of supporting and holding the hasp 19 in a rigid fixed position when in locked engagement with the cover recess 25 the respective opposed walls 22 and 26 of the base and cover engage the opposite elongated edges of the hasp for substantially their full length for purposes of obtaining and giving the hasp an unusually strong locking function to prevent unauthorized removal of the cover 3.

For purposes of reducing wind resistance to a minimum the carrier is of low contour only sufficiently high to allow the storage of a wheel and tire in the chamber 18 that is commensurate with the size of tire used on the automobile on the roof of which the carrier is positioned. For further reduction of wind resistance the base 2 is designed with an extended circumferential concave shaped flange structure 30 as shown. The outer peripheral edge area 31 of the flange may be cemented at its contact area 32 with the bottom 33. In the present instance the primary structure of the carrier is made as indicated of plastic such as fiber glass or the like.

The center area of the bottom 33 is provided with and formed into an upwardly extending frustoconical shaped wheel and tire support 34, the top 35 of the support has molded and imbedded therein hold down bolts 36 for engagement with the stud openings 37 in the conventional automobile wheel 38 together with elongated thumb nuts 39 to hold the wheel 38 down tightly to the top 35 as shown in FIG. 2 of the drawings.

The upper plane of the top 35 is provided at its center area with means for guiding, centering and positioning the wheel 38, with its attached tire 40 to the top 35 of the support comprising the upwardly directed cylindrical-shaped extension and wheel guide 41 having a rounded dome top 42 formed integrally with the top 35 of the support. This dome shaped top causes the wheel and its center opening 43 to readily slide into place on the wheel guide 41.

When mounting the wheel and tire to the top 35 of the support 34 for engagement with the wheel holddown bolts the wheel center opening 43 is positioned over and in alignment with the wheel guide 41, thence lowered to an engaged position with the guide, the wheel is then rotated slightly, if necessary, until the stud openings 37 of the wheel are in registration with the wheel holddown bolts 36, then lowered to full engagement therewith, the thumb nuts are then threadedly engaged with the bolts to tight engagement with the wheel.

The wheel guide 41 is in this instance an important feature of the invention in that it provides means for readily centering and positioning the wheel so that all of the stud holes 37 of the wheel may be easily placed in registration with the holddown bolts 36 all at one time whereby the wheel may be readily engaged therewith and pushed down to full engagement with its support without the usual guess work and blind manipulation for this type of operation.

The carrier may be fastened to the roof 44 of the automobile 45 as shown. In this respect the carrier bottom 33 is provided with bolt holes 46 and the roof 44 is provided with similarly located holes 47, with toggle like bolts 48 positioned in the pairs of carrier and roof holes to hold the carrier tightly to the roof structure.

As shown in the present drawings the bottom and lower portions of the carrier structure are slightly arched, producing a saddle effect, whereby the bottom of the carrier is adapted to hug, fit and engage the crowned top surface of the roof of the automobile. However, the plane of the underside of the carrier bottom may be adaptably designed to suit the surface on which it may be attached and supported, such as the rear trunk top or the like of an automobile.

I have described my invention specifically and in detail in order that its nature, operation and construction may be fully understood; however the specific terms used herein are used descriptively rather than in their limiting sense, with the scope of the invention being defined in the claims.

While the drawings and description apply to what is at present considered to be preferred embodiment of this invention, it will be obvious to those skilled in the art that various changes and modifications may be made therein without departing from the invention, and it is therefor aimed to cover all such changes and modifications as fall within the true spirit and scope of the invention.

What I claim as new and desire to be secured by Letters Patent is:

1. A vehicle roof carrier for a spare tire and wheel comprising a base and cover therefor, a chamber for housing and supporting the spare tire and wheel formed within and by the inner structure of the base and cover, cooperative rotatable cover and fixed base means comprising latch bolts and latches having wedge-clamping means for latching and engaging the cover under progressive wedge-clamping pressure to the base in a closed fixed position when the cover is partially rotated, the base having stop means for limiting the rotary movement of the said rotatable cover and to limit the progressive wedge-clamping pressure of the cover to the base and to stop the rotation at a given point and means for fixedly engaging the carrier to a supporting surface therefor, the said cover comprises a circumferential base engaging outer edge and said base comprising an upper circumferential top edge and a lower outwardly projecting circumferential step, the latch-clamping means being positioned circumferentially about circumferential interengaging areas of the cover and base which produce by the rotation of the cover a pressure-binding engagement of said outer edge of the cover and the said circumferential step of the base.

2. A vehicle roof carrier for a spare tire and wheel comprising a base and cover therefor, a chamber for housing and supporting the spare tire and wheel formed within and by the inner structure of the base and cover, cooperative rotatable cover and fixed base means comprising latch bolts and latches having wedge-clamping means for latching and engaging the cover under progressive wedge-clamping pressure to the base in a closed fixed position when the cover is partially rotated, the base having stop means for limiting the rotary movement of the said rotatable cover and to limit the progressive wedge-clamping pressure of the cover to the base and to stop the rotation at a given point and means for fixedly engaging the carrier to a supporting surface therefor, the pressure exerting latch-clamping means comprises the latch bolts attached to, positioned and spaced about an inner circumferential area of the cover in juxtaposition to a lower circumferential edge of the cover for interengagement with latch keepers attached to, positioned and similarly spaced about an outer circumferential step area of the base and in juxtaposition to the upper circumferential edge of the base, the latch bolts having top upwardly facing inclined surfaces and the latch keepers having bottom downwardly facing inclined surfaces, the full engagement of the inclined surfaces of the bolts and keepers having a wedge effect and tending to make a predetermined sealing engagement between the said lower circumferential edge of the cover and the said circumferential step of the base.

3. A vehicle roof carrier for a spare tire and wheel comprising a base and cover therefor, a chamber for housing and supporting the spare tire and wheel formed within and by the inner structure of the base and cover, cooperative rotatable cover and fixed base means comprising latch bolts and latches having wedge-clamping means for latching and engaging the cover under progressive wedge-clamping pressure to the base in a closed fixed position when the cover is partially rotated, the base having stop means for limiting the rotary movement of the said rotatable cover and to limit the progressive wedge-clamping pressure of the cover to the base and to stop the rotation at a given point and means for fixedly engaging the carrier to a supporting surface therefor, means for fixedly positioning and supporting the tire and wheel within the chamber comprising a frustoconical supporting structure with a plurality of bolts attached to the top thereof for engagement with stud openings in the wheel for fastening the wheel to the support, the top of the support comprising centered and upwardly extending wheel guide means for initial engagement with the wheel by engagement with a center opening in the wheel to initially center the wheel with the support.

4. A vehicle roof carrier for a spare tire and wheel comprising a base and cover therefor, a chamber for housing and supporting the spare tire and wheel formed within and by the inner structure of the base and cover, cooperative rotatable cover and fixed base comprising latch bolts and latches having wedge-clamping means for latching and engaging the cover under progressive wedge-clamping pressure to the base in a closed fixed position when the cover is partially rotated, the base having stop means for limiting the rotary movement of the said rotatable cover and to limit the progressive wedge-clamping pressure of the cover to the base and to stop the rotation at a given point and means for fixedly engaging the carrier to a supporting surface therefor, the cover and base are provided with locking means for locking the cover to the base after the cover has been rotated clockwise to full stop and closed position by engagement with the said stop means to prevent unauthorized rerotating the cover counterclockwise for its removal comprising a hasp pivotally mounted at one end between hasp engaging opposed walls of a base recess in an extension of the base, a lock attached to and carried at the opposite end of the hasp, a cover extension positioned above the base extension having a cover recess positioned in alignment with the base recess when in full stop position for receiving said opposite lock carrying end of the hasp, said locking means having means for locking the hasp within the cover recess.